United States Patent
Batakis et al.

(10) Patent No.: US 10,428,738 B2
(45) Date of Patent: Oct. 1, 2019

(54) START BIASED LIQUID FUEL MANIFOLD FOR A GAS TURBINE ENGINE

(71) Applicant: Solar Turbines Incorporated, San Diego, CA (US)

(72) Inventors: Anthony P. Batakis, San Diego, CA (US); Dietmar Karl Sauer, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 272 days.

(21) Appl. No.: 15/379,205

(22) Filed: Dec. 14, 2016

(65) Prior Publication Data

US 2018/0163634 A1    Jun. 14, 2018

(51) Int. Cl.
| | |
|---|---|
| F02C 7/22 | (2006.01) |
| F02C 7/232 | (2006.01) |
| F23R 3/34 | (2006.01) |
| F02C 7/228 | (2006.01) |
| F23R 3/46 | (2006.01) |
| F02C 9/26 | (2006.01) |

(52) U.S. Cl.
CPC .............. *F02C 7/222* (2013.01); *F02C 7/228* (2013.01); *F02C 7/232* (2013.01); *F23R 3/346* (2013.01); *F23R 3/46* (2013.01); *F02C 9/26* (2013.01); *F05D 2220/32* (2013.01); *F05D 2240/35* (2013.01); *F05D 2270/31* (2013.01)

(58) Field of Classification Search
CPC .. F02C 7/222; F02C 7/22; F02C 7/228; F02C 7/232; F02C 9/26; F02C 9/263; F02C 9/34; F02C 3/24; F05D 2270/31; F23R 3/34; F23R 3/346; F23R 3/36
See application file for complete search history.

(56) References Cited

U.S. PATENT DOCUMENTS

| | | | | |
|---|---|---|---|---|
| 4,402,184 A | * | 9/1983 | Faulkner | F02C 7/222 60/739 |
| 4,903,478 A | | 2/1990 | Seto et al. | |
| 5,036,657 A | * | 8/1991 | Seto | F02C 7/222 60/39.281 |
| 5,390,498 A | | 2/1995 | Sulkin | |
| 5,884,483 A | * | 3/1999 | Munro | F02C 7/22 60/734 |

(Continued)

FOREIGN PATENT DOCUMENTS

| | | | | |
|---|---|---|---|---|
| GB | 727820 A | * | 4/1995 | C10L 1/18 |
| GB | 2523126 A | | 8/2015 | |

*Primary Examiner* — Ehud Gartenberg
*Assistant Examiner* — Stephanie Cheng
(74) *Attorney, Agent, or Firm* — Procopio, Cory, Hargreaves & Savitch LLP

(57) ABSTRACT

A fuel distribution manifold for a gas turbine engine is disclosed herein. The fuel distribution manifold includes a manifold body, a stage divider, and a plurality of manifold outlet ports. The stage divider subdivides an internal volume of the manifold body into a primary stage volume and a secondary stage volume. A majority of the plurality of manifold outlet ports extends from the manifold body between the primary inlet port and the stage divider, each being fluidly connected to the primary stage volume. A remainder of the plurality of manifold outlet ports extends from the manifold body between the secondary inlet port and the stage divider, each being fluidly connected to the secondary stage volume.

14 Claims, 3 Drawing Sheets

(56) References Cited

U.S. PATENT DOCUMENTS

| | | | |
|---|---|---|---|
| 5,983,642 A | 11/1999 | Parker et al. | |
| 6,240,732 B1 | 6/2001 | Allan | |
| 6,786,049 B2 | 9/2004 | Parsons et al. | |
| 6,857,272 B2 | 2/2005 | Summerfield et al. | |
| 7,703,289 B2 | 4/2010 | Rudrapatna et al. | |
| 8,024,934 B2 | 9/2011 | Abreu et al. | |
| 8,079,220 B2 | 12/2011 | Haggerty | |
| 8,096,130 B2 * | 1/2012 | Morenko | F23R 3/283 60/734 |
| 2008/0245074 A1 | 10/2008 | Oda et al. | |
| 2009/0077945 A1 | 3/2009 | Cornwell et al. | |
| 2013/0340436 A1 | 12/2013 | Abreu | |
| 2013/0340438 A1 | 12/2013 | Abreu | |
| 2016/0195024 A1 * | 7/2016 | Hoke | F02C 7/228 701/100 |
| 2016/0245524 A1 | 8/2016 | Hill | |
| 2017/0342912 A1 * | 11/2017 | Kim | F02C 9/26 |

* cited by examiner

START BIASED LIQUID FUEL MANIFOLD FOR A GAS TURBINE ENGINE

TECHNICAL FIELD

The present disclosure generally pertains to a liquid fuel manifold, and is directed toward a start biased liquid fuel manifold for a gas turbine engine.

BACKGROUND

Gas turbine engines include compressor, combustor, and turbine sections. During start-up of the gas turbine engine, the liquid fuel may initially distribute unevenly to the fuel injectors, which may result in combustion imbalance and hot spots within the combustor.

U.S. Pat. No. 6,786,049 to Parsons, et al. discloses a fuel supply control system for a gas turbine includes a plurality of solenoid valves. The solenoid valves are energized in a timing sequence with a phase relationship designed to achieve a desired fuel flow. In one example, one solenoid valve is associated with a primary portion of a fuel manifold while at least two other solenoids are associated with a secondary portion of the manifold. A controller that energizes the solenoids to achieve the desired fuel flow can receive feedback information regarding turbine performance to make adjustments to the solenoid operation to bring the turbine performance closer to a desired level.

The present disclosure is directed toward overcoming one or more of the problems discovered by the inventors or that is known in the art.

SUMMARY OF THE DISCLOSURE

A system and method of liquid fuel distribution for a gas turbine engine is disclosed herein. In one aspect, the fuel distribution system includes a plurality of fuel injectors, a fuel distribution manifold, injector fuel tubing, a primary fuel line, a primary fuel control valve, a secondary fuel line, and a secondary fuel control valve. The plurality of fuel injectors is oriented circumferentially about a combustion chamber of the gas turbine engine. The fuel distribution manifold includes a manifold body, a stage divider, a primary inlet port, a secondary inlet port, a plurality of primary stage outlet ports, and a plurality of secondary stage outlet ports. The stage divider subdivides an internal volume of the manifold body into a primary stage volume and a secondary stage volume. The primary inlet port is fluidly connected and adjacent to the primary stage volume. The secondary inlet port is fluidly connected and adjacent to the secondary stage volume. The plurality of primary stage outlet ports extend from the manifold body between the primary inlet port and the stage divider. Each of the plurality of primary stage outlet ports is fluidly connected to the primary stage volume. The plurality of secondary stage outlet ports extends from the manifold body between the secondary inlet port and the stage divider. Each of the plurality of second stage outlet ports is fluidly connected to the secondary stage volume. The injector fuel tubing fluidly connects the plurality of primary stage outlet ports and the plurality of secondary stage outlet ports to the plurality of fuel injectors. The plurality of primary stage outlet ports provides the liquid fuel to a majority of the plurality of fuel injectors and the plurality of secondary state outlet ports provides the liquid fuel to the remainder of the plurality of fuel injectors. The primary fuel line fluidly connects the primary inlet port to a liquid fuel source. The primary fuel control valve is in the primary fuel line between the primary inlet port and the liquid fuel source. The secondary fuel line fluidly connects the secondary inlet port to the primary fuel line downstream of the primary fuel control valve. The secondary fuel control valve is in the secondary fuel line between the primary fuel line and the secondary inlet port.

In another aspect of the invention, a fuel distribution manifold includes a manifold body, a stage divider, a primary inlet port, a secondary inlet port, and a plurality of manifold outlet ports. The stage divider subdivides an internal volume of the manifold body into a primary stage volume and a secondary stage volume. The stage divider including a divider vent located adjacent to a manifold bottom dead center. This vent may improve purging of the liquid fuel after operation, to balance the pressure between the two manifold stages during steady state operation, and to prime the secondary stage with fuel prior to activating the secondary fuel valve to provide a minimized secondary stage fill time. The primary inlet port is fluidly connected and adjacent to the primary stage volume. The secondary inlet port is fluidly connected and adjacent to the secondary stage volume. Some of the plurality of manifold outlet ports extends from the manifold body between the primary inlet port and the stage divider, each being fluidly connected to the primary stage volume. The remainder of the plurality of manifold outlet ports extends from the manifold body between the secondary inlet port and the stage divider, each being fluidly connected to the secondary stage volume.

In a further aspect of the invention, the method for operating a gas turbine engine including a fuel distribution system with a plurality of fuel injectors and a fuel distribution manifold that is subdivided into a primary stage volume and a secondary stage volume by a stage divider is described herein. The method includes opening a primary fuel control valve while a secondary fuel control valve is closed during the startup sequence of the gas turbine engine. The primary fuel control valve is located in a primary fuel line between a liquid fuel source and a primary inlet port that is adjacent and fluidly connected to the primary stage volume that supplies a liquid fuel to the majority of the plurality of fuel injectors. The secondary fuel control valve is located in the secondary fuel line between a fluid connection to the primary fuel line downstream of the primary fuel control valve and a secondary inlet port that is adjacent and fluidly connected to the secondary stage volume that supplies the liquid fuel to the remainder of the plurality of fuel injectors. The method also includes opening the secondary fuel control valve after sufficient pressure is developed to assure adequate fuel distribution is achieved.

DETAILED DESCRIPTION

The systems and methods disclosed herein include a fuel distribution system. In embodiments, the fuel distribution system includes fuel injectors and a fuel distribution manifold with a volume split into a primary stage volume and a secondary stage volume. The primary stage volume may provide liquid fuel to a majority of the fuel injectors and the secondary stage volume may provide the liquid fuel to a remainder of the fuel injectors. During a start-up sequence of the gas turbine engine, fuel lines may provide liquid fuel to the primary stage volume, but not to the secondary stage volume, which allows the pressure in the primary stage volume to build up quickly. This quick pressure build up may result in quicker flow balance of liquid fuel to the active fuel injectors and may prevent hot spots from forming in the combustion chamber. The fuel distribution manifold may further includes a divider vent extending through the stage divider, which may prime the secondary stage volume with fuel prior to the fuel lines providing the liquid fuel to the secondary stage volume, may balance the pressure between the two manifold stage volumes during steady state operation, and may improve purging of the liquid fuel from the fuel distribution manifold after shut down of the gas turbine engine.

Figure 1:
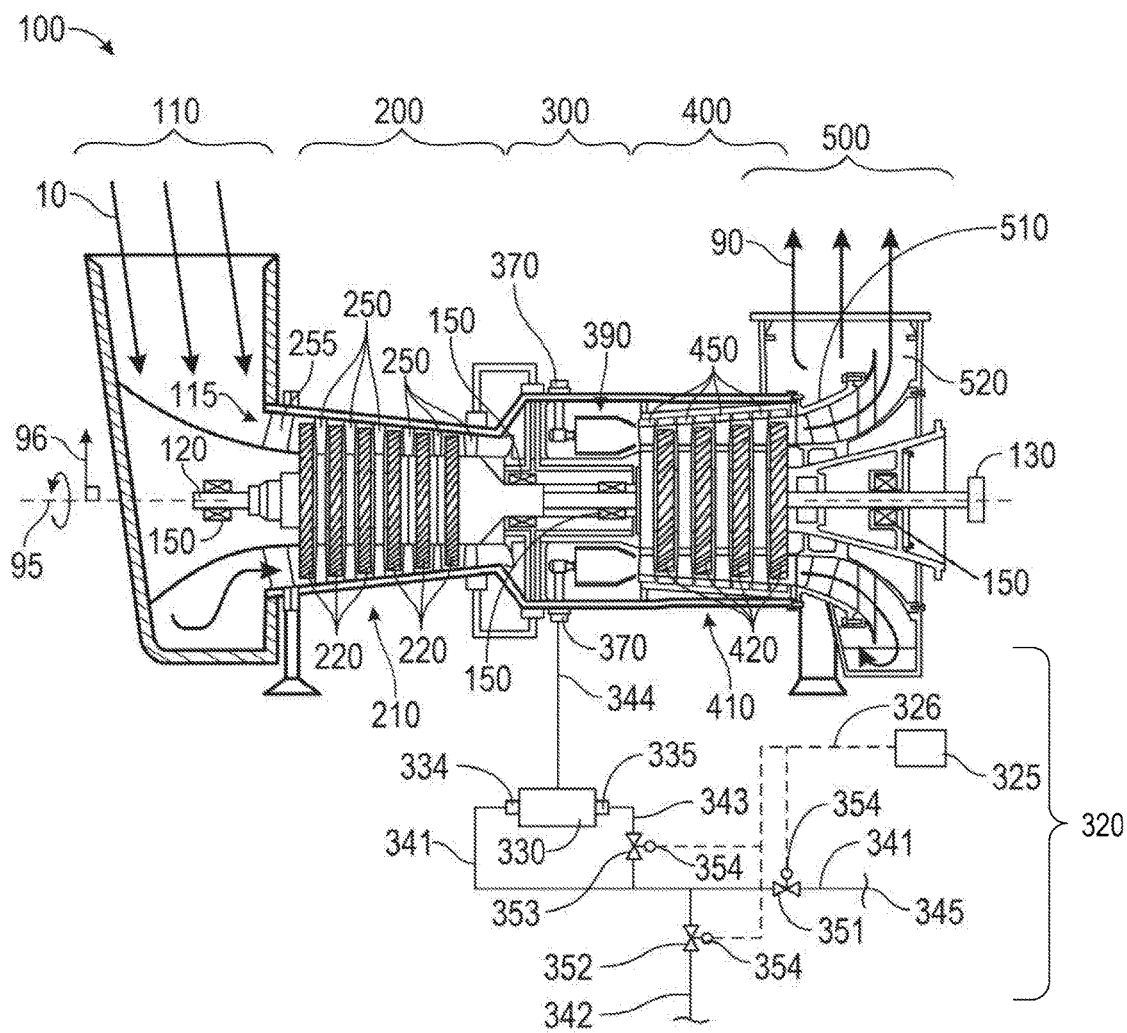
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from center axis 95, wherein a radial direction 96 may be in any direction perpendicular and radiating outward from center axis 95.

A gas turbine engine 100 includes an inlet 110, a shaft 120, a compressor 200, a combustor 300, a turbine 400, an exhaust 500, and a power output coupling 130. The gas turbine engine 100 may have a single shaft or a dual shaft configuration.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

Figure 3:
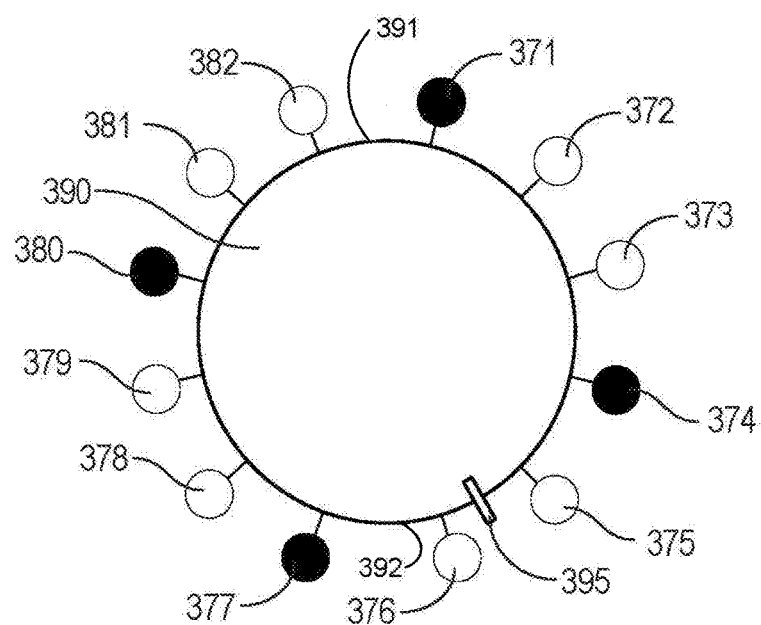
FIG. 3 is a schematic illustration of the combustor of FIG. 1 showing the relative locations of the fuel injectors with respect to the combustion chamber.

The combustor 300 includes a combustion chamber 390 and one or more fuel injectors 370. The fuel injectors 370 may be upstream of the combustion chamber 390 and may be circumferentially arranged about center axis 95 as illustrated in FIG. 3.

The turbine 400 includes a turbine rotor assembly 410 and turbine nozzles 450. The turbine rotor assembly 410 mechanically couples to the shaft 120. In the embodiment illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages.

The exhaust 500 includes an exhaust diffuser 510 and an exhaust collector 520. The power output coupling 130 may be located at an end of shaft 120.

The gas turbine engine 100 may also include a fuel distribution system 320. The fuel distribution system 320 delivers pressurized fuel to the fuel injectors 370 and may include a fuel distribution manifold 330, a primary fuel line 341, a secondary fuel line 343, a fuel vent line 342, a primary fuel control valve 351, a secondary fuel control valve 353, a purge valve 352, injector fuel tubes 344, and a fuel controller 325. The fuel distribution manifold 330 may include a primary inlet port 334 and a secondary inlet port 335.

The primary fuel line 341 may connect to and provide fuel to the primary inlet port 334 from a fuel source 345. The secondary fuel line 343 may split off from the primary fuel line 341 and may provide fuel to the secondary inlet port 335. The fuel vent line 342 may split off from the primary fuel line 341 and may provide an outlet to a purge sump for purging the fuel distribution manifold 330 of fuel after shut-down of the gas turbine engine 100. The fuel vent line 342 may connect to the primary fuel line 341 at an elevation lower than the fuel distribution manifold 330.

The primary fuel control valve 351 is located along the primary fuel line 341 upstream of where the secondary fuel line 343 splits from the primary fuel line 341. The primary fuel control valve 351 controls and meters the amount of fuel provided to the fuel distribution manifold 330 and to the primary inlet port 334. The secondary fuel control valve 353 is located along the secondary fuel line 343 between the connection to the primary fuel line 341 and to the secondary inlet port 335. The purge valve 352 is located along the fuel vent line 342. The primary fuel control valve 351, the secondary fuel control valve 353, and the purge valve 352 may each be actuation valves and may include an actuator 354 that opens and closes the valves based on control signals provided by the fuel controller 325.

The injector fuel tubes 344 connect to the fuel distribution manifold 330 and to the fuel injectors 370 to supply fuel to the fuel injectors 370. For the ease of comprehension, only a single injector fuel tube 344 connected to a single fuel injector 370 is shown in FIG. 1.

The fuel controller 325 may include an electronic control circuit having a central processing unit ("CPU"), such as a processor, or micro controller. Alternatively, the fuel controller 325 may include programmable logic controllers or field-programmable gate arrays. The fuel controller 325 may also include memory for storing computer executable instructions, which may be executed by the CPU. The memory may further store data related to controlling the fuel flow during the startup of the gas turbine engine 100. The fuel controller 325 may include inputs and outputs to receive sensor signals and send control signals over controller connection lines 326, such as to control and actuate the primary fuel control valve 351, the secondary fuel control valve 353, and the purge valve 352.

Figure 2:
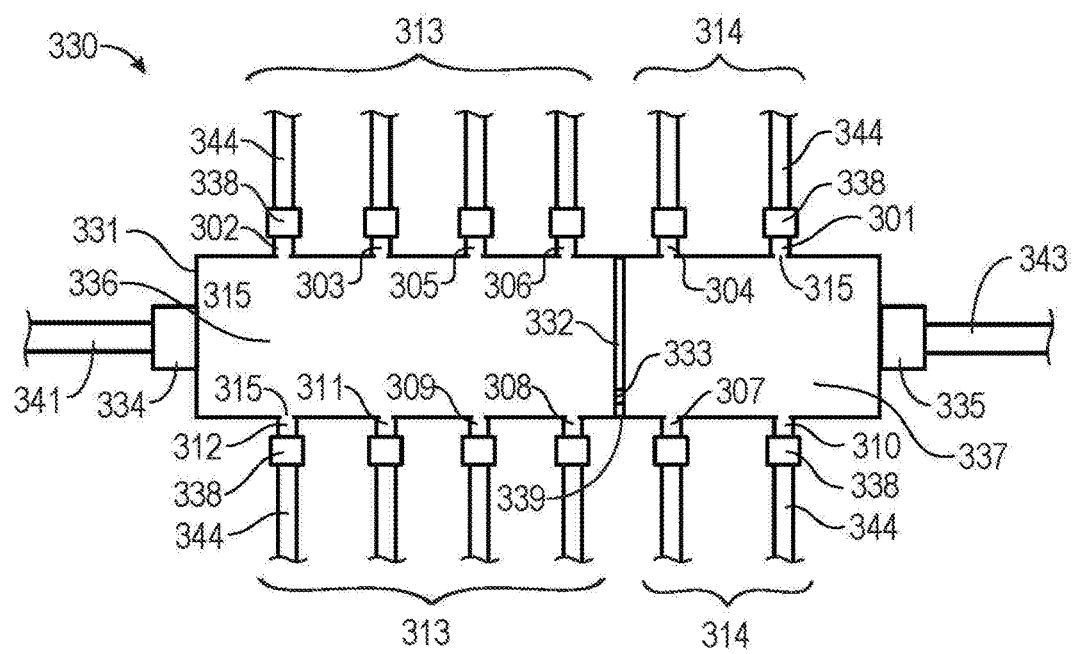
FIG. 2 is a schematic illustration of the fuel distribution system of FIG. 1.

FIG. 2 is a schematic illustration of the fuel distribution system 320 of FIG. 1. As illustrated in FIG. 2, the fuel distribution manifold 330 may also include a manifold body 331, a stage divider 332, and manifold outlet ports. The manifold body 331 may be a hollow tube, such as a hollow cylinder. The primary inlet port 334 may be located at one end of the manifold body 331 and the secondary inlet port 335 may be located at the opposite end of the manifold body 331.

The stage divider 332 may separate and subdivide the inner volume of the manifold body 331 into two separate volumes, a primary stage volume 336 adjacent the primary inlet port 334 and a secondary stage volume 337 adjacent the secondary inlet port 335. The stage divider 332 may include a divider vent 333 extending there through. The divider vent 333 may be at or adjacent to the manifold bottom dead center 339. The divider vent 333 may permit some fuel to flow between the primary stage volume 336 and the secondary stage volume 337.

The manifold outlet ports may extend from the manifold body 331 and may extend transverse to the primary inlet port 334 and the secondary inlet port 335, such as in a radial direction relative to the manifold body 331. Each manifold outlet port may include a metering orifice that is sized to meter the amount of fuel passing there through from within the manifold body 331 and into the manifold outlet port. Each manifold outlet port may be joined to an injector fuel tube 344 via a fitting 338, the injector fuel tube 344 connecting to a corresponding fuel injector 370.

In the embodiment illustrated, the fuel distribution manifold 330 includes twelve manifold outlet ports including a first manifold outlet port 301, a second manifold outlet port 302, a third manifold outlet port 303, a fourth manifold outlet port 304, a fifth manifold outlet port 305, a sixth manifold outlet port 306, a seventh manifold outlet port 307, an eighth manifold outlet port 308, a ninth manifold outlet port 309, a tenth manifold outlet port 310, an eleventh manifold outlet port 311, and a twelfth manifold outlet port 312. Each manifold outlet port may be numbered relative to the fuel injector 370 that the manifold outlet port corresponds to.

The manifold outlet ports may be separated into primary stage outlet ports 313 and secondary stage outlet ports 314. The primary stage outlet ports 313 may connect to the manifold body 331 between the primary inlet port 334 and the stage divider 332, and may be fluidly connected to the primary stage volume 336. The secondary stage outlet ports 314 may connect to the manifold body 331 between the secondary inlet port 335 and the stage divider 332, and may be fluidly connected to the secondary stage volume 337.

A majority of the manifold outlet ports may be primary stage outlet ports 313 and the remainder of the manifold outlet ports may be secondary stage outlet ports 314. In embodiments, two-thirds of the manifold outlet ports are primary stage outlet ports 313 and one-third of the manifold outlet ports are secondary stage outlet ports 314 In the embodiment illustrated, eight manifold outlet ports are primary stage outlet ports 313 including the second manifold outlet port 302, the third manifold outlet port 303, the fifth manifold outlet port 305, the eighth manifold outlet port 308, the ninth manifold outlet port 309, the eleventh manifold outlet port 311, and the twelfth manifold outlet port 312; and four manifold outlet ports are secondary stage outlet ports 314 including the first manifold outlet port 301, the fourth manifold outlet port 304, the seventh manifold outlet port 307, and the tenth manifold outlet port 310.

FIG. 3 is a schematic illustration of the combustor 300 of FIG. 1 showing the relative locations of the fuel injectors 370 with respect to the combustion chamber 390. As illustrated in FIG. 3, the fuel injectors 370 may be arranged circumferentially about the combustion chamber 390 and may be numbered referentially counter-clockwise or clockwise starting from one of the fuel injectors adjacent to the combustion chamber top dead center 391.

In the embodiment illustrated, the combustor 300 includes twelve fuel injectors 370 including a first fuel injector 371, a second fuel injector 372, a third fuel injector 373, a fourth fuel injector 374, a fifth fuel injector 375, a sixth fuel injector 376, a seventh fuel injector 377, an eighth fuel injector 378, a ninth fuel injector 379, a tenth fuel injector 380, an eleventh fuel injector 381, and a twelfth fuel injector 382. The fuel injectors may be evenly distributed circumferentially about the combustion chamber 390 in order from the first fuel injector 371 to the twelfth fuel injector 382 where the first fuel injector 371 and the twelfth fuel injector 382 are adjacent the combustion chamber top dead center 391.

Each fuel injector 370 may be fluidly connected to the manifold outlet port of the same number via an injector fuel tube 344, such as the first fuel injector 371 being fluidly connected to the first manifold outlet port 301. Thus, a majority, such as two-thirds, of the fuel injectors 370 may be fluidly connected to the primary stage volume 336 and the remainder, such as one-third, of the fuel injectors 370 may be fluidly connected to the secondary stage volume 337. In the embodiment illustrated in FIGS. 2 and 3, every third fuel injector 370 spanning around the circumference of the combustion chamber 390 is fluidly connected to the secondary stage volume 337, where the fuel injectors 370 connected to the secondary stage volume 337 are shown as a solid circle and the fuel injectors 370 connected to the primary stage volume 336 are shown as hollow circles. The fuel injectors 370 fluidly connected to the primary stage volume 336 may be primary fuel injectors and the fuel injectors 370 fluidly connected to the secondary stage volume 337 may be secondary fuel injectors 370. In the embodiment illustrated, one of the fuel injectors 370 adjacent the combustion chamber bottom dead center 392 is a secondary fuel injector 370.

In the embodiment illustrated, the first fuel injector 371, the fourth fuel injector 374, the seventh fuel injector 377, and the tenth fuel injector 380 are fluidly connected to the secondary stage volume 337; and the second fuel injector 372, the third fuel injector 373, the fifth fuel injector 375, the sixth fuel injector 376, the eighth fuel injector 378, the ninth fuel injector 379, the eleventh fuel injector 381, and the twelfth fuel injector 382 are fluidly connected to the primary stage volume 336.

Referring to FIGS. 2 and 3, in some embodiments, the manifold outlet ports corresponding to the fuel injectors 370 closest to the combustion chamber top dead center 391 may be arranged closest to the inlet ports, while the manifold outlet ports corresponding to the fuel injectors 370 closest to the combustion chamber bottom dead center 392 may be arranged furthest from the inlet ports. Further, the manifold outlet ports may be grouped together on a side of the manifold body 331 depending on which side of the combustion chamber 390 their corresponding fuel injectors 370 are situated.

Referring to FIG. 3, the combustor 300 may include a torch 395 situated between two fuel injectors 370. In the embodiment illustrated, the torch 395 is circumferentially located between the fifth fuel injector 375 and the sixth fuel injector 376.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 390 and combusted. An air and fuel mixture is supplied via fuel injector 370. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the system via an exhaust collector 520 and may be further processed (e.g., to reduce harmful emissions, and/or to recover heat from the exhaust gas 90).

During the startup sequence of a gas turbine engine, the liquid fuel may not evenly distribute to the fuel injectors. The metering orifices in distribution manifolds may not be effective at low flows. The head differential in the fuel tubes connected to the fuel injectors adjacent to and closest to the combustion chamber top dead center as compared to the fuel injectors adjacent to and closest to the combustion chamber bottom dead center may cause an imbalance of fuel distribution to the fuel injectors at lower flows and pressures, which may result in hot spots near the bottom of the combustion chamber.

Figure 4:
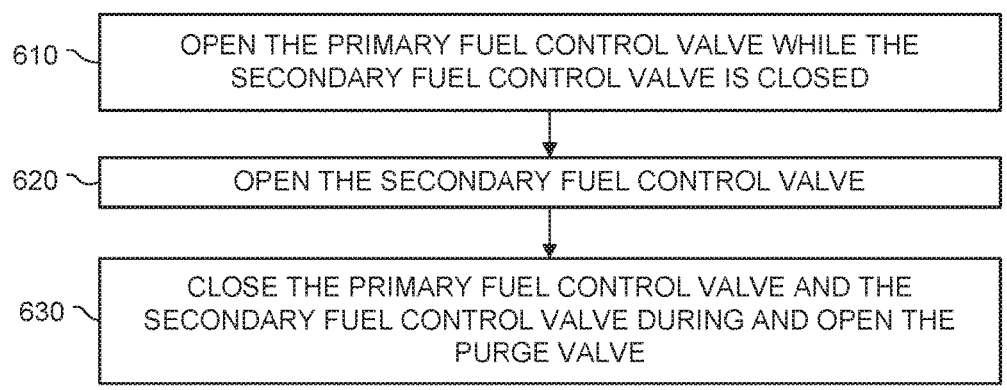
FIG. 4 is a flowchart of a method for the startup of the gas turbine engine of FIG. 1.

FIG. 4 is a flowchart of a method for operating the gas turbine engine of FIG. 1. The method includes opening the primary fuel control valve 351 while the secondary fuel control valve 353 is closed during the startup sequence of the gas turbine engine 100 at step 610. Step 610 may include opening the primary fuel control valve 351 to gradually increase the amount of fuel delivered to the fuel injectors 370 as the gas turbine engine speeds up. Opening the primary fuel control valve 351 while the secondary fuel control valve 353 is closed allows the primary fuel line 341 to deliver the liquid fuel to the primary inlet port 334 and subsequently to the primary stage volume 336 without the secondary fuel line 343 delivering the liquid fuel to the secondary inlet port 335 and subsequently to the secondary stage volume 337. Thus, liquid fuel is delivered to a majority, such as two-thirds, of the fuel injectors 370 that are evenly distributed about the circumference of the combustion chamber 390.

Limiting the number of fuel injectors 370 active during the beginning of the start-up sequence may cause the pressure of the liquid fuel to increase quicker within the primary stage volume 336, which may result in the metering orifices 315 effectively metering and balancing the flow through the primary stage outlet ports 313 much quicker. This quicker increase in pressure may help the system overcome the head differentials that may exist in the injector fuel tubes 344 connected to the fuel injectors 370 adjacent or near the combustion chamber top dead center 391. Balancing the flow earlier may prevent hots spots from forming due to an imbalance of the fuel flow to certain fuel injectors 370, and in particular to the fuel injectors 370 closest to the combustion chamber bottom dead center 392.

In some embodiments, one of the fuel injectors 370 closest to the combustion chamber bottom dead center 392 is a secondary fuel injector and does not initially receive fuel, which may further reduce the possibility of a hot spot forming near the combustion chamber bottom dead center 392.

The method also includes opening the secondary fuel control valve 353 after sufficient pressure is achieved in the primary stage volume 336 at step 620. This pressure level assures adequate fuel distribution. In embodiments, sufficient pressure is achieved when the pressure is high enough to overcome and offset the adverse effects of gravitational head in the injector fuel tubes 344 on the flow distribution to the active fuel injectors 370. This pressure level in the primary stage volume 336 may occur prior to the gas turbine engine 100 reaching two-thirds of the engine speed. In some embodiments, step 620 includes opening the secondary fuel control valve 353 after 70 percent of the engine speed is achieved. The engine speed may be the rotational speed of the shaft 120 at the steady state operational condition of the gas turbine engine 100. In other embodiments, step 620 includes opening the secondary fuel control valve 353 after the starter motor is disengaged.

Step 620 may also include opening the secondary fuel control valve 353 before full engine idle speed is achieved. In some embodiments, the full engine idle speed is the same as the steady state speed. In other embodiments the full engine idle speed is slightly lower, such as ninety-five percent of the steady state speed. In these embodiments, opening the secondary fuel control valve 353 is performed before ninety-five percent engine speed is achieved.

Opening the secondary fuel control valve 353 may cause a temporary pressure drop in the primary stage volume 336. However, the divider vent 333 may allow some of the fuel to begin to fill up the secondary stage volume 337 during step 610, which may prime the secondary stage volume 337 and may significantly reduce the recovery time of the temporary pressure drop. In some embodiments, the secondary inlet port 335 may be situated closer to the primary fuel control valve 351 than the primary inlet port 334, which may reduce the distance the liquid fuel has to travel during step 620 and may further reduce the recovery time of the temporary pressure drop. By closer, it is understood to be the total conduit length measured between the primary fuel control valve 351 and the inlet ports. The divider vent 333 may also allow the pressure to remain balanced between the primary stage volume 336 and the secondary stage volume 337 during steady state operation of the gas turbine engine 100, while the secondary control valve 353 is in an open position.

The method may further include closing the primary fuel control valve 351 during a shut-down sequence of the gas turbine engine 100 and opening the purge valve 352 at step 630. Opening the purge valve 352 may allow the liquid fuel in the fuel distribution manifold 330 and in the injector fuel tubes 344 to drain from the fuel distribution system 320, which may be done to prevent coking of the liquid fuel and for safety precautions. The liquid fuel may be drained partially by the pressure built up in the fuel distribution system 320 and by gravity.

The fuel distribution manifold 330 may be oriented and angled with the primary inlet port 334 at a lower elevation than the secondary inlet port 335, which may facilitate the draining of the liquid fuel out of the fuel distribution manifold 330. The divider vent 333 may be located in the stage divider 332 at the manifold bottom dead center 339, which may further facilitate the draining of the liquid fuel out of the fuel distribution manifold 330.

In some embodiments, the method may still further include closing the purge valve 352 and closing the secondary fuel control valve 353 prior to step 610.

The fuel controller 325 may be configured to perform the various steps of the method as described herein, such as opening and closing the primary fuel control valve 351, the secondary fuel control valve 353, and the purge valve 352 by sending control signals to the actuators 354 connected thereto.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes particular embodiments of the fuel distribution system and fuel distribution manifold, it will be appreciated that the fuel distribution system and fuel distribution manifold in accordance with this disclosure can be implemented in various other configurations, can be used with various other types of gas turbine engines, and can be used in other types of machines. Further, elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A liquid fuel distribution system for a gas turbine engine, the fuel distribution system comprising:
    a plurality of fuel injectors oriented circumferentially about a combustion chamber of the gas turbine engine;
    a fuel distribution manifold including
        a manifold body,
        a stage divider subdividing an internal volume of the manifold body into a primary stage volume and a secondary stage volume, the stage divider including a divider vent fluidly connecting the primary stage volume to the secondary stage volume,
        a primary inlet port fluidly connected and adjacent to the primary stage volume,
        a secondary inlet port fluidly connected and adjacent to the secondary stage volume,
        a plurality of primary stage outlet ports extending from the manifold body between the primary inlet port and the stage divider, each of the plurality of primary stage outlet ports being fluidly connected to the primary stage volume, and
        a plurality of secondary stage outlet ports extending from the manifold body between the secondary inlet port and the stage divider, each of the plurality of second stage outlet ports being fluidly connected to the secondary stage volume;
    injector fuel tubing fluidly connecting the plurality of primary stage outlet ports and the plurality of secondary stage outlet ports to the plurality of fuel injectors, where the plurality of primary stage outlet ports provides a liquid fuel to a majority of the plurality of fuel injectors and the plurality of secondary stage outlet ports provides the liquid fuel to a remainder of the plurality of fuel injectors;
    a primary fuel line fluidly connecting the primary inlet port to a liquid fuel source;
    a primary fuel control valve in the primary fuel line between the primary inlet port and the liquid fuel source;
    a secondary fuel line fluidly connecting the secondary inlet port to the primary fuel line downstream of the primary fuel control valve; and
    a secondary fuel control valve in the secondary fuel line between the primary fuel line and the secondary inlet port.

2. The fuel distribution system of claim 1, wherein the divider vent is adjacent to a manifold bottom dead center.

3. The fuel distribution system of claim 1, further comprising a fuel controller that controls the actuation of the primary fuel control valve and the secondary fuel control valve, the fuel controller configured to open the primary fuel control valve during a startup of the gas turbine engine while the secondary fuel control valve is closed, and open the secondary fuel control valve after the gas turbine engine reaches 70 percent of an engine speed of the gas turbine engine.

4. The fuel distribution system of claim 1, wherein a first total conduit length between the secondary inlet port and the primary fuel control valve is less than a second total conduit length between the primary inlet port and the primary fuel control valve.

5. The fuel distribution system of claim 1, wherein a fuel injector of the plurality of fuel injectors closest to a combustion chamber bottom dead center is fluidly connected to a manifold outlet port of the plurality of secondary stage outlet ports.

6. The fuel distribution system of claim 2, further comprising a fuel vent line fluidly connected to the primary fuel line between the primary fuel control valve and the primary inlet port, and a purge valve in the fuel vent line that is configured to open and allow the liquid fuel to drain from the fuel distribution system after the gas turbine engine is shut down.

7. The fuel distribution system of claim 1, wherein the plurality of primary stage outlet ports provides the liquid fuel to two-thirds of the plurality of fuel injectors and the plurality of secondary stage outlet ports provides the liquid fuel to one-third of the plurality of fuel injectors.

8. The fuel distribution system of claim 1, wherein the plurality of fuel injectors are arranged such that every third fuel injector of the plurality of fuel injectors is fluidly connected to one of the plurality of secondary stage outlet ports.

9. The fuel distribution system of claim 1, wherein the plurality of fuel injectors includes twelve fuel injectors, wherein eight of the fuel injectors are fluidly connected to the primary stage outlet ports and four of the fuel injectors are fluidly connected to the secondary stage outlet ports.

10. A fuel distribution manifold for a fuel distribution system of a gas turbine engine, the fuel distribution manifold comprising:

a manifold body;

a stage divider subdividing an internal volume of the manifold body into a primary stage volume and a secondary stage volume, the stage divider including a divider vent fluidly connecting the primary stage volume to the secondary stage volume;

a primary inlet port fluidly connected and adjacent to the primary stage volume;

a secondary inlet port fluidly connected and adjacent to the secondary stage volume;

a plurality of manifold outlet ports, wherein a majority of the plurality of manifold outlet ports extend from the manifold body between the primary inlet port and the stage divider, each being fluidly connected to the primary stage volume, and a remainder of the plurality of manifold outlet ports extend from the manifold body between the secondary inlet port and the stage divider, each being fluidly connected to the secondary stage volume.

11. The fuel distribution manifold of claim 10, further comprising a fitting for connecting a fuel tube to each of the plurality of manifold outlet ports, wherein each of the plurality of manifold outlet ports fluidly connects to a fuel injector of the gas turbine engine, the fuel injectors are circumferentially arranged around a combustion chamber of the gas turbine engine and every third fuel injector is configured to fluidly connect to the secondary stage volume.

12. The fuel distribution manifold of claim 10, wherein the majority of the plurality of manifold outlet ports is two-thirds of the plurality of manifold outlet ports and wherein the remainder of the plurality of manifold outlet ports is one-third of the plurality of manifold outlet ports.

13. The fuel distribution manifold of claim 10, further comprising:

a primary fuel line fluidly connecting the primary inlet port to a liquid fuel source;

a primary fuel control valve in the primary fuel line between the primary inlet port and the liquid fuel source;

a secondary fuel line fluidly connecting the secondary inlet port to the primary fuel line downstream of the primary fuel control valve; and a secondary fuel control valve in the secondary fuel line between the primary fuel line and the secondary inlet port.

14. The fuel distribution manifold of claim 13, further comprising a fuel vent line fluidly connected to the primary fuel line between the primary fuel control valve and the primary inlet port, and a purge valve in the fuel vent line that is configured to open and allow the liquid fuel to drain from the fuel distribution system after the gas turbine engine is shut down, wherein the divider vent is adjacent a manifold bottom dead center to facilitate the draining of the liquid fuel from the fuel distribution manifold.

\* \* \* \* \*